(12) United States Patent
de Lamberterie

(10) Patent No.: US 9,250,378 B2
(45) Date of Patent: Feb. 2, 2016

(54) LIGHTING DEVICE INCLUDING A LIGHT RAY GUIDE

(71) Applicant: VALEO VISION, Bobigny Cedex (FR)

(72) Inventor: Antoine de Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/520,617

(22) Filed: Oct. 22, 2014

(65) Prior Publication Data

US 2015/0131324 A1   May 14, 2015

(30) Foreign Application Priority Data

Oct. 23, 2013 (FR) ...................... 13 60341

(51) Int. Cl.
| | |
|---|---|
| *F21V 13/04* | (2006.01) |
| *F21V 13/02* | (2006.01) |
| *F21V 8/00* | (2006.01) |
| *F21S 8/10* | (2006.01) |

(52) U.S. Cl.
CPC ........... *G02B 6/0045* (2013.01); *F21S 48/1159* (2013.01); *F21S 48/125* (2013.01); *F21S 48/1241* (2013.01); *F21S 48/1747* (2013.01); *F21S 48/2231* (2013.01); *G02B 6/0035* (2013.01); *G02B 6/0073* (2013.01); *G02B 6/0078* (2013.01)

(58) Field of Classification Search
CPC .. G02B 6/0045; G02B 6/0001; G02B 6/0073; G02B 6/0078; F21S 48/1159; F21S 48/1241; F21S 48/125; F21S 48/1168; F21S 48/2231
See application file for complete search history.

(56) References Cited

U.S. PATENT DOCUMENTS

| | | | |
|---|---|---|---|
| 7,207,705 B2 | 4/2007 | Ishida | |
| 8,550,676 B2 | 10/2013 | Ohno et al. | |
| 8,899,782 B2 | 12/2014 | Sikkens et al. | |
| 2003/0214815 A1* | 11/2003 | Ishida et al. | 362/516 |
| 2006/0087860 A1 | 4/2006 | Ishida | |
| 2008/0225548 A1* | 9/2008 | Eichelberger | 362/551 |
| 2011/0085343 A1 | 4/2011 | Ohno et al. | |
| 2012/0314442 A1* | 12/2012 | Takahashi et al. | 362/538 |
| 2013/0051014 A1 | 2/2013 | Sikkens et al. | |

FOREIGN PATENT DOCUMENTS

| | | |
|---|---|---|
| DE | 102007052696 A1 | 7/2008 |
| EP | 2306073 A2 | 4/2011 |
| JP | 2008078086 A | 4/2008 |
| JP | 2010129311 A | 6/2010 |
| WO | 2011121488 A1 | 10/2011 |

* cited by examiner

*Primary Examiner* — Tracie Y Green
(74) *Attorney, Agent, or Firm* — Jacox, Meckstroth & Jenkins

(57) ABSTRACT

A lighting and/or signaling device and a light ray guide (N) formed by a guide plate comprising a light entry face, a light exit face and a reflection face having an elliptical profile toward the rear adapted to assure reflection of light rays entering the guide plate through the light entry face toward a focus point (F) located at the level of the light exit face of the guide plate.

21 Claims, 3 Drawing Sheets

LIGHTING DEVICE INCLUDING A LIGHT RAY GUIDE

CROSS-REFERENCE TO RELATED APPLICATIONS

This application claims priority to French Application No. 1360341 filed Oct. 23, 2013, which application is incorporated herein by reference and made a part hereof.

BACKGROUND OF THE INVENTION

1. Field of the Invention

The present invention relates to the field of lighting and/or signaling devices for vehicles. In particular, the present invention relates to a lighting and/or signaling device for a motor vehicle including a light ray guide. The invention also concerns a light ray guide as such.

2. Description of the Related Art

Such lighting devices generally comprise a light source that emits light rays and a light guide in which light rays from the light source propagate by reflection.

In the prior art, and notably in the automotive field, it is known to combine a plurality of lighting functions in this type of lighting device, so as to simplify the electrical wiring generally resulting from these various functions. The patent document EP2306073 describes an example in which these functions are combined using a plurality of light guides with one or more light sources.

However, one of the major drawbacks of such lighting devices is linked to the fact that such configurations systematically generate a loss of efficacy and efficiency, notably, at the level of the light beam generated at the output of these devices.

Moreover, the latter devices are generally bulky and costly to design.

The present invention aims to solve these problems resulting from the drawbacks of the prior art.

SUMMARY OF THE INVENTION

Consequently, one of the objects of the invention is to solve the problem linked to improving the performance of lighting and/or signaling devices including a light ray guide at the same time as making them less compact.

Moreover, one of the advantages of such a device is having a very low manufacturing cost compared to prior art lighting and/or signaling devices.

With this aim, the invention concerns a light ray guide formed by a guide plate comprising a light entry face, a light exit face and a reflection face having an elliptical profile toward the rear adapted to assure reflection of light rays entering the plate through the light entry face toward a focus point located at the level of the light exit face of the plate.

In particular embodiments:
the focus point is located at a distance from an upper edge of the exit face of the plate;
the focus point is located on an upper edge of the exit face of the plate;
the guide plate is delimited longitudinally by the exit face which is an edge surface of the plate extending vertically and transversely at the front end of the plate;
the exit face is plane;
the guide plate is delimited longitudinally by a reflection face which is an edge surface lying at the rear of the plate and is curved in a vertical longitudinal plane with an elliptical profile;
the light entry, reflection and exit faces extend over all the width of the plate;
the reflection face extends from a lower edge of the light exit face;
a cross section of the reflection face has a roof-shaped prism profile, notably over all the length of the reflection face; there is to be understood by cross section of the exit face at a point the section of the exit face on a plane normal to the exit face at that point;
a cross section of the reflection face has a rectilinear profile;
the guide plate is delimited vertically by a front face which is an edge surface extending from an upper edge of the light exit face;
the front face is plane;
the front face has two plane parts joined by a bend;
the guide plate is delimited vertically by the entry face which is an edge surface extending transversely and longitudinally;
the entry face extends from an edge of the reflection face to an edge of a front face;
the guide plate is delimited transversely by two guide faces;
the width of the plate, measured between the two guide faces, is small compared to the dimensions of these guide faces; these guide faces delimit an area of propagation of the light rays in the guide by internal reflection at these faces;
the guide faces are plane;
the guide plate has a constant thickness corresponding to the width of the entry face and the exit face;
the guide plate is made in one piece from a transparent material such as polycarbonate or polymethylmethacrylate, and
there is a reflective area over part or the whole of the reflection face.

The invention also concerns a lighting and/or signaling device, notably for vehicles, having an optical axis and including a light source and a lens, the device including such a light ray guide arranged between the light source and the lens so that light rays emitted by the light source in the guide propagate in the guide to reach the lens and on emerging from the lens have a substantially horizontal direction containing the optical axis of the device.

In particular embodiments:
the light source is adapted to emit a cone of light along a main emission axis, a focus point of the guide plate being disposed so that a ray emitted by the light source in a direction parallel to the main emission axis leaves the guide in a direction parallel to the optical axis;
the guide plate formed by the guide is disposed vertically;
the plate is disposed so that at least one of the guide faces is disposed in a plane intersecting the optical axis, notably containing the optical axis of the lens;
the guide plate is arranged relative to the lens so that a focus point corresponds to the object focus of the lens;
the light source is arranged at the level of an entry face of the guide plate;
the device comprises a plurality of guide plates each associated with a light source, this light source being disposed at the level of an entry face of the associated plate, the plates being arranged in a fan, the plates being tangential at the level of their exit face and diverging progressively to produce a spacing between each light source;
the tangential exit faces form a field curve associated with the lens, and the light sources are arranged on the same printed circuit.

These and other objects and advantages of the invention will be apparent from the following description, the accompanying drawings and the appended claims.

BRIEF DESCRIPTION OF THE ACCOMPANYING DRAWINGS

Other advantages and features of the invention will become more apparent on reading the following description with reference to the following figures and given by way of illustrative and nonlimiting example of two preferred embodiments:

DETAILED DESCRIPTION OF THE PREFERRED EMBODIMENTS

In the context of the description and the claims, there will be adopted by way of nonlimiting example longitudinal orientations directed from the rear toward the front with reference to the general direction of emission indicated in the figures by the arrow Ox, vertically upward and transverse, which are indicated by the trihedron "L,V,T" represented in the figures.

Figure 1:
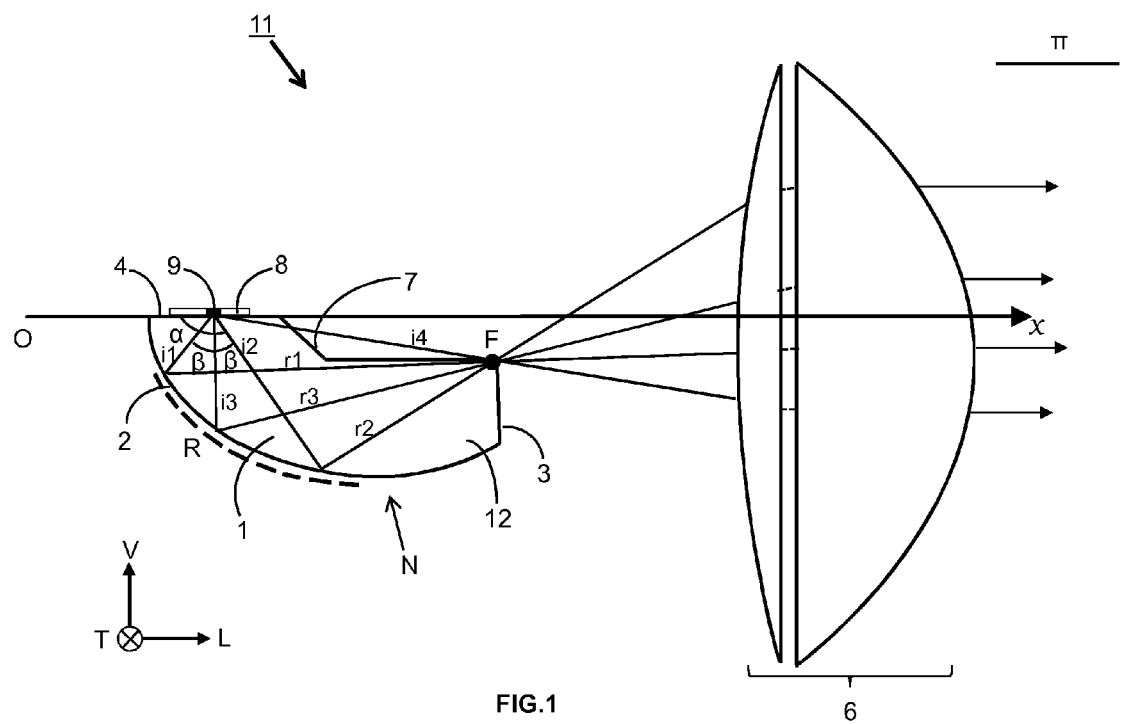
FIG. 1 represents a side view of the lighting and/or signaling device in accordance with a first variant of a first embodiment of the invention.
Figure 2:
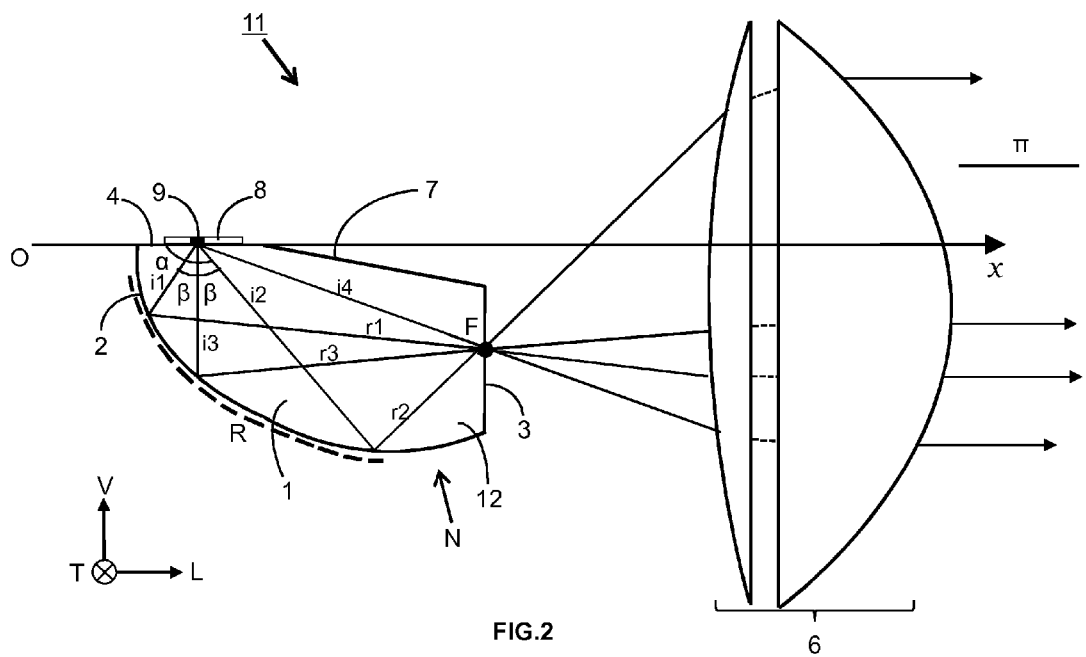
FIG. 2 shows a side view of the lighting and/or signaling device in accordance with a second variant of a first embodiment of the invention.

In a first embodiment represented in FIGS. 1 and 2, the lighting and/or signaling device 11 for motor vehicles has an optical axis Ox and is designed to project a light beam globally forwards along a longitudinal optical axis Ox.

This lighting and/or signaling device 11 includes at least one light source 9 and at least one light ray guide N arranged between the at least one light source 9 and a lens 6 so that light rays emitted by the at least one light source 9 in the at least one light ray guide N propagate in the at least one light ray guide N to reach the lens 6 and on emerging from the lens 6 have a substantially horizontal direction containing the optical axis of the lighting and/or signaling device 11.

The transparent material at least one light ray guide N has an entry face 4 adapted to cooperate with the at least one light source 9.

This at least one light ray guide N is formed by a light guide plate 1, or plate, which here extends in a longitudinal vertical plane. This light guide plate 1 is disposed vertically. Such a light guide plate 1 is made in one piece from a transparent material such as polycarbonate (PC) or polymethylmethacrylate (PMMA). This light guide plate 1 has an edge with an elliptical profile. Alternatively, this light guide plate 1 may be manufactured as a plurality of parts.

This light guide plate 1 is contained between two parallel main faces delimited by a contour notably formed by four faces or edge surfaces.

To be more precise, this light guide plate 1 is delimited longitudinally by three faces corresponding to:

a light exit face 3, notably an edge surface of the light guide plate 1 extending vertically and transversely at the front end of the light guide plate 1;

a reflection face 2, notably an edge surface extending to the rear of the light guide plate transversely and that is curved in a vertical longitudinal plane with an elliptical profile, and a front face 7 that delimits the light guide plate 1 vertically and notably on an edge surface extending from an upper edge of the light exit face 3.

This light guide plate 1 is delimited vertically by the light entry face 4 corresponding to an edge surface extending transversely and longitudinally. The light entry face 4 extends from an edge of the reflection face 2 to an edge of the front face 7.

The front face 7, entry face 4, reflection face 2 and light exit face 3 extend over all the width of the light guide plate 1.

The reflection face 2 and the front face 7 extend between the remote ends of the light entry face 4 and the light exit face 3. It will be noted that the reflection face 2 extends from a lower edge of the light exit face 3.

It will be noted that this elliptical profile reflection face 2 is conjugate with the at least one light source 9 situated at the level of the light entry face 4 with the focus F located at the level of the light exit face 3 of the light guide plate 1.

As previously stated, the light guide plate 1 is contained between two parallel main faces of the at least one light ray guide N delimited by the contour with four faces. The two parallel main faces, referred to as the lateral guide faces 12 and 13, delimit this light guide plate 1 transversely. These two lateral guide faces 12 and 13 are plane. As previously stated, they are also parallel to each other so that the light guide plate 1 has a constant transverse thickness that is small compared to its longitudinal and vertical dimensions. Such a thickness is between approximately 1 and 5 mm, the vertical dimension is between approximately 10 and 50 mm and the longitudinal dimension is between approximately 20 and 70 mm. It will be noted that this constant thickness corresponds to the width of the light entry face 4 and the light exit face 3.

The width of the light guide plate 1, measured between the two guide faces 12, 13, is small compared to the dimensions of these guide faces 12, 13. These guide faces 12, 13 delimit an area of propagation of the light rays in the at least one light ray guide N by internal reflection at these guide faces 12, 13.

In a manner that is not limiting on the invention, it will be considered that the light guide plate 1 formed by the at least one light ray guide N is disposed vertically and that the light entry face 4 is rectilinear and located in a horizontal plane. For its part the light exit face 3 is plane and orthogonal to the light entry face 4, i.e. vertical. In this configuration, the light guide plate 1 is disposed so that at least one of the guide faces 12, 13 is arranged in a plane intersecting the optical axis, notably containing the optical axis Ox of the lens 6.

Alternatively, it will be noted that the light exit face 3 may be inclined.

The elliptical profile reflection face 2 has a focus located at the level of the light entry face 4 of the at least one light ray guide N. The center, or some other point, of the at least one light source 9 is placed at this focus. This at least one light source 9 is disposed on a supporting board 8 including a printed circuit for the connections to this at least one light source 9.

This at least one light source 9 preferably consists of at least one light-emitting diode (LED) of plane geometry. It will be noted that the arrangement of the at least one light source 9 relative to the light entry face 4 is particular in that there is a clearance of 0.1 mm to 0.5 mm between them. Such an arrangement makes it possible to improve the reliability of the lighting and/or signaling device 11, notably vis à vis vibrations of the at least one light ray guide N.

This at least one light source 9, notably its emitting surface, may have various shapes: a shape that may be elongate, circular, rectangular, square, etc.

The at least one light source 9 is arranged horizontally at the level of the light entry face 4 and is adapted to emit a cone of light along a substantially vertical main emission axis, the focus point F of the light guide plate 1 being disposed so that a ray emitted by the at least one light source 9 in a direction parallel to the main emission axis leaves the at least one light ray guide N in a direction parallel to the optical axis.

As previously stated, the at least one light source 9 is in an optimum configuration arranged as close as possible to the light entry face 4 of the at least one light ray guide N.

Figure 4A:
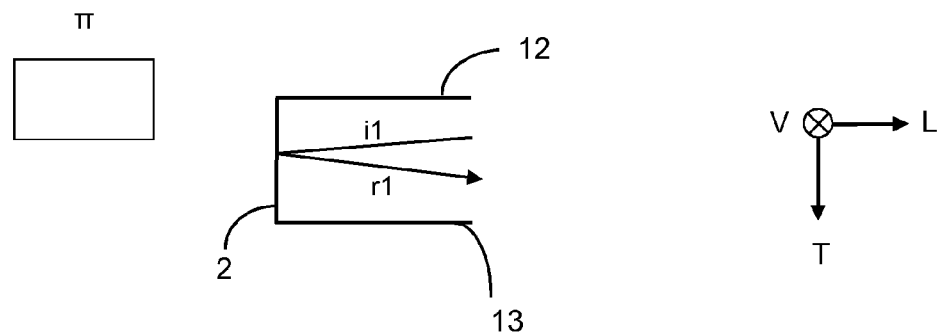
FIG. 4A shows a plan view of a first configuration of a reflection face of the guide in any of the embodiments of the invention.
Figure 4B:
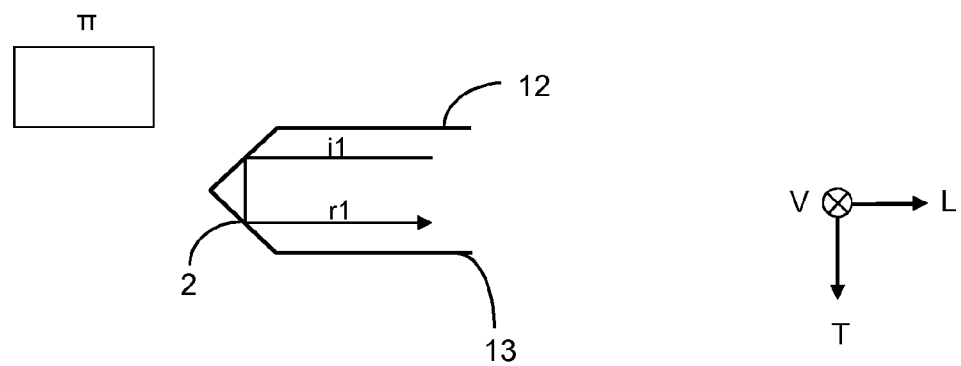
FIG. 4B represents a plan view of a second configuration of the reflection face of the guide in any of the embodiments of the invention.

The light rays emitted by this at least one light source 9 are adapted to propagate in the light guide plate 1 by total reflection against the reflection face 2. Seen from above, as represented in FIGS. 4A and 4B, the light rays move in a straight line. Accordingly, the reflection face 2 of the elliptical profile has the function of reflecting the light rays toward the focus point F of the light exit face 3, while the light exit face 3 has the function of transmitting the light rays out of the light guide plate 1 by refraction in order to form the light beam at the exit of this lighting and/or signaling device 11.

This focus point F is located on an upper edge of the light exit face 3 of the light guide plate 1. Alternatively, this focus point F may be located at a distance from the upper edge of the exit face 3 of the light guide plate 1.

This at least one light source 9, placed very close to the light entry face 4, emits a beam along a substantially vertical main emission axis. The rays of this beam are first refracted by the light entry face 4 and propagate in the light guide plate 1 as a small cone with a beam aperture of approximately an angle 3 on either side of the normal to the emitting surface.

The value of the angle β will depend on the refractive index of the material constituting the light guide plate 1; it will be approximately 40° when the light guide plate 1 is made of polycarbonate (PC). The extent of the elliptical profile reflection face 2 is chosen so that the angle α at which this reflection face 2 is seen from the at least one light source 9 extends on either side of the normal to the source at least at an angle α of approximately 45° in general, in order to recover as much as possible of the luminous flux from the at least one light source 9.

All of the rays of the beam emitted by the at least one light source 9 enter the light guide plate 1 to be guided therein in the vertical direction perpendicular to the plane of FIGS. 1 and 2, thereafter to be reflected therein toward the focus point F of the light exit face 3, in the vertical plane of FIGS. 1 and 2. The at least one light source 9 is then able to produce a pixel the angular width of which is directly related to the thickness of the at least one light ray guide N.

The material constituting the guide plate 1 does not require the reflection face 2 to be coated with aluminum for most of the rays emitted by the at least one light source 9 to arrive at an angle of incidence greater than the total reflection angle.

Accordingly, a ray i1 located in the plane of FIGS. 1 and 2, emitted by the at least one light source 9 and inclined forward relative to the normal to the source, then has an angle of incidence on the rear face 7 greater than the total reflection angle. This ray i1 is reflected as a ray r1 toward the focus point F.

For a ray i3 emitted by the at least one light source 9 toward the reflection face 2 in a direction similar to the normal to the source generally has an angle of incidence substantially equal to the total reflection angle. The ray i3 is then reflected as a ray r3 toward the focus point F.

It will be noted that to the extent to which the reflection face 2 is coated with aluminum, which is not systematically the case as described hereinafter, a ray i2 emitted by the at least one light source 9 toward the rear relative to the normal to the source generally has an angle of incidence less than the total reflection angle. The ray i2 is then reflected as a ray r2 toward the focus point F.

The various rays r1, r2 and r3 are reflected at the level of the reflection face 2, for example at the level of the reflective area R.

It will be noted in FIGS. 1 and 2 that some light rays i4 are emitted directly toward the light exit face 3 of the light guide plate 1, which they reach with an angle of incidence that enables the light rays to be transmitted out of the light guide plate 1 by refraction. The other light rays r1, r2 or r3, as previously stated, are reflected by the reflection face 2 in the direction of the light exit face 3, which they reach with an angle of incidence that enables the reflected light rays to be transmitted out of the light guide plate 1 by refraction. It will be noted that the fact that the reflection face 2 is conformed as an ellipse makes it possible to have two focus points: one at the source, the other on the light exit face 3.

The reflective area R is over a part or the whole of the reflection face 2. It is arranged in the longitudinal plane so as to reflect in the light guide plate 1 any light ray propagating in the light guide plate 1.

This reflective area R includes a surface that is adapted to redirect the light rays r1, r2 or r3 that reach it (at least in part) in the light guide plate 1 by reflection. It includes any optical means enabling this reflection, for example:

a treatment of the surface concerned rendering it intrinsically reflective, notably when the profile of the reflection face 2 is elliptical; this is notably a question of depositing a thin reflective coating;

the optical characteristics of the elliptical profile of the reflection face 2 including this reflective area R that offers an angle of incidence of the rays to be reflected such as to enable the rays to be reflected at the surface of this area in accordance with the total reflection principle, as shown in FIG. 4A;

a configuration of this reflective area R so that it has characteristics similar to those of a roof-shaped prism, then enabling the production of a double internal reflection for some of the rays directed toward this area, as shown in FIG. 4B.

In a variant, this reflective area R may be produced on the basis of a combination of these reflection means. For example, by combining two of the reflection means mentioned above, it is possible to deposit a reflective layer on part of the surface of this reflective area R and to interrupt the layer over the rest of the surface, which functions by total reflection. The delimitation between the area to be coated with aluminum and the total reflection area may be determined accurately by an optics specialist.

As previously stated, the reflective area R can therefore be partly or totally covered by the reflective material coating to reflect rays in the light guide plate 1. In practice, the reflective material coating encroaches slightly on the nearby end portions of the light entry and light exit faces 3, 4 of the reflection face 2 so that all the light rays emitted by the at least one light source 9 are used to form the light beam.

Each reflective material coating is produced beforehand on the reflective area R associated with the reflection face 2 of the light guide plate 1. It is a matter for example of depositing material using known aluminum deposition techniques or the application of an adhesive film made from a reflective material.

In FIG. 4A, which is a plan view of the reflection face 2, this elliptical profile reflection face 2, having a shape in cross section having a rectilinear profile, has optical characteristics offering an angle of incidence of the rays to be reflected such as to enable the rays to be reflected at the surface of this area R in accordance with the total reflection principle. These optical characteristics notably result from the properties of the material constituting the light guide plate 1 and by extension constituting the reflection face 2. By the cross section of the reflection face 2 at a point is meant the section of the reflection face 2 on a plane normal to the reflection face at this point.

In FIG. 4B, which is a plan view of the reflection face 2, this reflection face 2 has a cross section having a profile in the shape of a roof-shaped prism, notably over all the length of this reflection face. Such a configuration enables the production of double internal reflection for some or all of the rays directed toward the reflection face 2. Such a configuration has the advantage that the losses at the level of the reflection are negligible. Moreover, by employing two total internal reflections for the rays directed toward the reflection face 2, it is then possible to avoid coating the reflective area R of the reflection face 2 of the light guide plate 1 with aluminum, which leads to a reduction of manufacturing cost and an improvement of the light yield. In fact, aluminization processes are very costly.

Moreover, the lens 6, known as the projection lens, is arranged at the level of the light exit face 3 and is adapted to recover the rays leaving the light guide plate 1. The focus point F located on the light exit face 3 corresponds to the main object focus of this lens 6. The light rays transmitted to the outside via the focus on the light exit face 3 form the light beam which is projected by the lens 6 along the longitudinal optical axis Ox.

This lens 6 therefore provides collimation (i.e. forms a beam of parallel rays) in the direction of the optical axis in the vertical plane. The emergent rays coming from the focus therefore have a direction that is contained in the horizontal plane IF containing the optical axis Ox.

The aperture of the exit beam from the light guide plate 1 at the level of the light exit face 3 may be configured so as to enable the rays to enter the lens 6 in an optimum manner. Such optimization is obtained by offsetting the at least one light source 9 with the focus point F vertically. Accordingly, the location of the focus point F on the light exit face 3 is a function of that of the source at the level of the light entry face 4.

Two variants of the lighting and/or signaling device 11 are represented in FIGS. 1 and 2. These two variants are distinguished from each other by the fact that the front faces 7 of their light guide plate 1 are different. In fact, in the variant shown in FIG. 1 this front face 7, produced in accordance with the principle of the effect of the bend, includes two plane parts joined by a bend. In this variant, the focus point F is then located where this front face 7 crosses the light exit face 3. Thanks to the effect of the bend, the range of the beam leaving the light guide plate 1 may be optimized. In this context, the configuration of the aperture of the beam leaving the light guide plate 1 is obtained by offsetting the at least one light source 9 relative to the focus point F, taking the effect of the bend into account.

The beam obtained at the exit from the lens 6 is a relatively open vertical beam with a low cut-off.

In the variant shown in FIG. 2, the front face 7 of the light guide plate 1 is plane. Accordingly, the beam is optimized without using the effect of the bend. This being so, the configuration of the aperture of the beam leaving the light guide plate 1 is obtained by offsetting the at least one light source 9 relative to the focus point F. This focus point F can then, as a function of this offsetting of the at least one light source 9, be located substantially below an upper edge of the light exit face 3 of the light guide plate 1.

Figure 3:
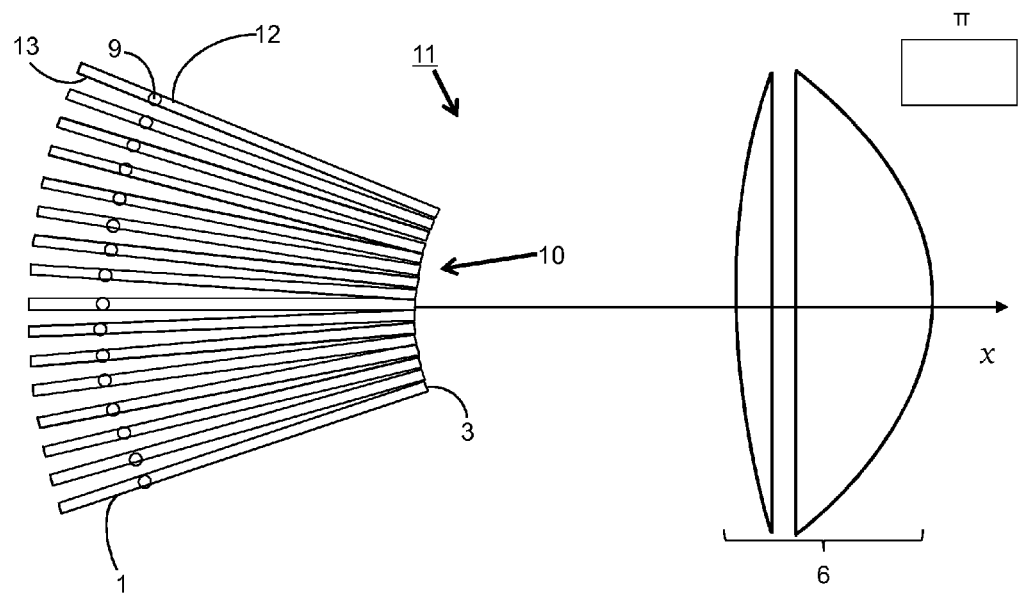
FIG. 3 represents a plan view of the lighting and/or signaling device according to a second embodiment of the invention.

In a second embodiment of this lighting and/or signaling device 11 that is represented in FIG. 3, differing in this respect from that of the previous embodiment, the lighting and/or signaling device 11 comprises a plurality of light guide plates 1 aligned globally transversely. In the present embodiment, this lighting and/or signaling device 11 includes sixteen light guide plates 1. Each of these light guide plates 1 has the same characteristics and shapes as the light guide plate 1 described in connection with the first embodiment.

This lighting and/or signaling device 11 also includes a lens 6 arranged at the level of the light exit faces 3 of this plurality of light guide plates 1. This lens 6 is adapted to recover the rays leaving the light guide plates 1. Each light guide plate 1 is arranged relative to the lens 6 so that the focus point F located on the light exit face 3 of each of these light guide plates 1 corresponds to the main object focus of this lens 6. In other words, the lens 6 has a plurality of object foci each corresponding to a focus point F of the light guide plates 1. The light rays transmitted to the outside via the focus on the light exit face 3 form the light beam that is projected by the lens 6 along the longitudinal optical axis. This lens 6 provides collimation (i.e. forms a beam of parallel rays) in the direction of the optical axis in the vertical plane. Accordingly, the emergent rays coming from the focus F have a direction that is contained within the horizontal plane IF containing the optical axis Ox.

These light guide plates 1 are arranged like a fan and are tangential at the level of their light exit face 3 and progressively diverge to produce a spacing between the at least one light sources 9 of each of these light guide plates 1.

More specifically, the edge or edges of the light guide plate 1 resulting from the intersection of the planes formed by the lateral guide faces 12 and/or 13 with the plane formed by the light exit face 3 of each light guide plate 1 are adjacent one another so as to form a field curve 10 associated with the lens 6. This field curve 10 may be configured as a function of the lens 6 used in this lighting and/or signaling device 11. In fact, this configuration of the field curve 10 makes it possible to reduce the field aberrations that may be caused by the lens 6.

Each light guide plate 1 includes at least one light source 9 disposed at the level of its light entry face 4 in a similar manner to the first embodiment.

These at least one light sources 9 may be arranged on the same printed circuit, although this is not limiting on the invention. Each at least one light source 9 can produce a pixel the angular width of which is directly linked to the thickness of the at least one light ray guide N.

The behavior of the light rays in each of these light guide plates 1 is identical to that described for the first embodiment.

These optical axes are inclined relative to one another so that each light guide plate 1 contributes to the formation of the light beam by illuminating a preferential direction that is not necessarily on the longitudinal optical axis.

Accordingly, this lighting and/or signaling device 11 then makes it possible to produce a beam made up of an assembly of vertical pixels (or light points), each vertical pixel notably being produced from at least one light source 9 that can be turned off or turned on on command from a control system connected to the at least one light source 9. Accordingly, such a lighting and/or signaling device 11 can for example enable the production of ADB (Adaptive Driving Beam) type functions. Such functions implemented by the lighting and/or signaling device 11 make it possible to be able to illuminate the road taken by a vehicle in a "partial road lighting mode", namely to generate in a high beam one or more dark windows corresponding to the locations at which vehicles coming in the opposite direction or vehicles traveling in the same direction are present, so as to avoid dazzling occupants of these vehicles, at the same time as lighting the greatest area of the road.

The lighting and/or signaling device 11 of these two embodiments has numerous advantages, for example low compactness, notably in terms of width, and/or improved performance, notably from the luminous efficacy point of view.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light ray guide (N) comprising:
a plurality of guide plates, each of said plurality of guide plates being generally planar and comprising a light entry face, a light exit face and a reflection face having an elliptical profile toward a rear of said guide plate and being adapted to assure reflection of light rays entering said guide plate through said light entry face toward a focus point (F) located at a level of said light exit face of said guide plate;
wherein a light source is associated with each of said plurality of guide plates, said light source being disposed at a level of said light entry face, said plurality of guide plates being arranged in a fan arrangement, said plurality of guide plates being tangential at a level of their exit face and diverging progressively to produce a spacing between each light source;
said light ray guide producing a beam made up of an assembly of a plurality of vertical pixels, each vertical pixel notably being produced from said light source that can be turned off or turned on on command from a control system connected to said light source.

2. The light ray guide (N) according to claim 1, wherein said focus point (F) is located at a distance from an upper edge of said light exit face of each of said plurality of guide plates.

3. The light ray guide (N) according to claim 1, wherein said focus point (F) is located on an upper edge of said light exit face of each of said plurality of guide plates.

4. The light ray guide (N) according to claim 1, wherein each of said plurality of guide plates is delimited longitudinally by said light exit face which is an edge surface of each of said plurality of guide plates extending vertically and transversely at a front end of each of said plurality of guide plates.

5. The light ray guide (N) according to claim 1, wherein said guide plate is delimited longitudinally by said reflection face which is an edge surface lying at the rear of each of said plurality of guide plates and is curved in a vertical longitudinal plane with an elliptical profile.

6. A light ray guide (N) comprising:
a guide plate comprising a light entry face, a light exit face and a reflection face having an elliptical profile toward the rear adapted to assure reflection of light rays entering said guide plate through said light entry face toward a focus point (F) located at a level of said light exit face of said guide plate;
wherein said guide plate is delimited longitudinally by said reflection face which is an edge surface lying at the rear of said guide plate and is curved in a vertical longitudinal plane with an elliptical profile;
wherein a cross section of said reflection face has a roof-shaped prism profile over all a length of said reflection face.

7. A light ray guide (N) comprising:
a guide plate comprising a light entry face, a light exit face and a reflection face having an elliptical profile toward the rear adapted to assure reflection of light rays entering said guide plate through said light entry face toward a focus point (F) located at a level of said light exit face of said guide plate;
wherein said guide plate is delimited longitudinally by said reflection face which is an edge surface lying at the rear of said guide plate and is curved in a vertical longitudinal plane with an elliptical profile;
wherein a cross section of said reflection face has a rectilinear profile.

8. The light ray guide (N) according to claim 1, wherein each of said plurality of guide plates is delimited vertically by a front face which is an edge surface extending from an upper edge of said light exit face.

9. The light ray guide (N) according to claim 8, wherein said front face is plane.

10. The light ray guide (N) according to claim 8, wherein said front face has two plane parts joined by a bend.

11. The light ray guide (N) according to claim 1, wherein each of said plurality of guide plates is delimited vertically by said light entry face which is an edge surface extending transversely and longitudinally.

12. The light ray guide (N) according to claim 1, wherein each of said plurality of guide plates is delimited transversely by two guide faces.

13. The light ray guide (N) according to claim 1, wherein each of said plurality of guide plates has a constant thickness corresponding to a width of said light entry face and said light exit face.

14. A lighting and/or signaling device, notably for vehicles, having an optical axis (Ox) and including a light source and a lens, wherein said lighting and/or signaling device includes a light ray guide (N) according to claim 1 arranged between said light source and said lens so that light rays emitted by said light source in said light ray guide (N) propagate in said light ray guide (N) to reach said lens and on emerging from said lens have a substantially horizontal direction containing said optical axis (Ox) of said lighting and/or signaling device.

15. The lighting and/or signaling device according to claim 14, wherein said light source is adapted to emit a cone of light along a main emission axis, a focus point (F) of each of said plurality of guide plates being disposed so that a ray emitted by said light source in a direction parallel to a main emission axis leaves said light ray guide (N) in a direction parallel to said optical axis (Ox).

16. The lighting and/or signaling device according to claim 14, wherein each of said plurality of guide plates is arranged relative to said lens so that a focus point (F) corresponds to an object focus of said lens.

17. The light ray guide (N) according to claim 2, wherein each of said plurality of guide plates is delimited longitudinally by said light exit face which is an edge surface of each of said plurality of guide plates extending vertically and transversely at a front end of each of said plurality of guide plates.

18. The light ray guide (N) according to claim 3, wherein each of said plurality of guide plates is delimited longitudinally by said light exit face which is an edge surface of each of said plurality of guide plates extending vertically and transversely at a front end of each of said plurality of guide plates.

19. The light ray guide (N) according to claim 2, wherein each of said plurality of guide plates is delimited longitudinally by said reflection face which is an edge surface lying at the rear of each of said plurality of guide plates and is curved in a vertical longitudinal plane with an elliptical profile.

20. The light ray guide (N) according to claim 1, wherein a cross section of said reflection face has a roof-shaped prism profile over all a length of said reflection face.

21. The light ray guide (N) according to claim 1, wherein a cross section of said reflection face has a rectilinear profile.

* * * * *

UNITED STATES PATENT AND TRADEMARK OFFICE
CERTIFICATE OF CORRECTION

PATENT NO. : 9,250,378 B2  
APPLICATION NO. : 14/520617  
DATED : February 2, 2016  
INVENTOR(S) : de Lamberterie It is certified that error appears in the above-identified patent and that said Letters Patent is hereby corrected as shown below:

In the Specification

Column 5, line 32, delete "dose" and insert --close-- therefor.

Column 7, line 43, delete "IF" and insert --π-- therefor.

Column 8, line 34, delete "IF" and insert --π-- therefor.

Signed and Sealed this  
Nineteenth Day of July, 2016

Michelle K. Lee  
*Director of the United States Patent and Trademark Office*